United States Patent [19]
Suzuki et al.

[11] Patent Number: 5,941,282
[45] Date of Patent: Aug. 24, 1999

[54] ELECTROMAGNETIC VALVE UNIT

[75] Inventors: Masao Suzuki, Owariasahi; Takao Tsunooka, Kariya; Yoshimichi Hara, Kuwana; Shinichi Shimono, Takahama, all of Japan

[73] Assignees: Aisin Seiki Kabushiki Kaisha; Denso Corporation, both of Kariya, Japan

[21] Appl. No.: 08/955,609

[22] Filed: Oct. 22, 1997

[30] Foreign Application Priority Data

Oct. 25, 1996 [JP] Japan .................................. 8-301091

[51] Int. Cl.⁶ ........................................................ B60T 8/32
[52] U.S. Cl. .................... 137/884; 137/560; 251/129.15; 303/119.3
[58] Field of Search ........................ 251/129.15, 129.01; 303/119.2, 119.3; 137/884, 560; 174/65 SS, 65 G, 150.52, 150.57, 150.63; 439/426, 272, 271; 285/124.1, 25, 26, 28, 29, DIG. 910; 277/630, 634, 637, 642, 641

[56] References Cited

U.S. PATENT DOCUMENTS

| | | | |
|---|---|---|---|
| 3,456,232 | 7/1969 | Dupre ....................................... | 439/426 |
| 3,571,779 | 3/1971 | Collier ..................................... | 439/272 |
| 4,201,436 | 5/1980 | Genovese et al. ....................... | 439/426 |
| 4,690,478 | 9/1987 | Rahrig et al. ............................ | 439/271 |
| 4,796,159 | 1/1989 | Miksche .................................. | 439/137 |
| 4,840,571 | 6/1989 | Minata et al. ........................... | 439/426 |
| 5,040,853 | 8/1991 | Burgdorf et al. ....................... | 303/119.3 |
| 5,275,478 | 1/1994 | Schmitt et al. . | |
| 5,288,141 | 2/1994 | Isshiki et al. .......................... | 303/119.3 |
| 5,374,114 | 12/1994 | Burgdorf et al. ..................... | 303/119.2 |
| 5,386,337 | 1/1995 | Sachoettl .............................. | 303/119.2 |
| 5,449,227 | 9/1995 | Steinberg et al. .................... | 303/119.2 |
| 5,474,108 | 12/1995 | Inden et al. . | |
| 5,482,362 | 1/1996 | Robinson .............................. | 137/119.2 |
| 5,513,905 | 5/1996 | Zeides et al. ......................... | 303/119.2 |
| 5,681,099 | 10/1997 | Steffes et al. ........................ | 303/119.2 |
| 5,758,931 | 6/1998 | Hio et al. .............................. | 303/119.2 |

FOREIGN PATENT DOCUMENTS

| | | |
|---|---|---|
| 0 499 670 | 8/1992 | European Pat. Off. . |
| 30 24 894 | 1/1982 | Germany . |
| 38 13 138 | 11/1989 | Germany . |
| 40 01 017 | 7/1991 | Germany . |
| 41 00 967 | 7/1992 | Germany . |
| 41 33 641 | 4/1993 | Germany . |
| 43 43 325 | 6/1995 | Germany . |
| 42 32 205 | 5/1996 | Germany . |
| 195 45 011 | 4/1997 | Germany . |
| 195 08 011 | 6/1997 | Germany . |
| 196 19 968 | 11/1997 | Germany . |
| 2 249 874 | 5/1992 | United Kingdom . |
| 2 298 452 | 9/1996 | United Kingdom . |

*Primary Examiner*—John Rivell
*Assistant Examiner*—Meredith H. Schoenfeld
*Attorney, Agent, or Firm*—Burns, Doane, Swecker & Mathis, LLP

[57] ABSTRACT

The invention is directed to an electromagnetic valve unit, which includes a housing for defining therein a first chamber and a second chamber separated by a wall member having at least a communication hole, and a plurality of electromagnetic valves each having at least a terminal. At least a part of each electromagnetic valve is mounted in the first chamber. A circuit board for mounting thereon an electronic control element for controlling the electromagnetic valves is mounted in the second chamber. The valve unit further includes a conductive member, one end portion of which is connected with each terminal of the electromagnetic valves, and the other end portion of which is connected with the circuit board through the communication hole of the wall member. And, a seal member such as a resilient grommet is provided for holding the conductive member in the communication hole of the wall member to provide a seal therebetween. Each of the electromagnetic valves may be provided with a valve portion and a solenoid coil portion which is separable from the valve portion and which has the terminal connected with the conductive member.

19 Claims, 3 Drawing Sheets

ELECTROMAGNETIC VALVE UNIT

BACKGROUND OF THE INVENTION

1. Field of the Invention

The present invention relates to an electromagnetic valve unit, more particularly to the electromagnetic valve unit which is applicable to a hydraulic pressure control apparatus for an automotive vehicle.

2. Description of the Related Arts

In a conventional hydraulic pressure control apparatus of an automobile, such as the one for use in an anti-skid control apparatus, a plurality of electromagnetic valves have been employed for controlling the hydraulic pressure. One such electromagnetic valve unit has been proposed in the U.S. Pat. No. 5,474,108, wherein the electromagnetic valves are divided into a portion for controlling the hydraulic pressure and a solenoid coil portion, so that solenoid coils of the electromagnetic valves can be electrically connected at a time.

In a British publication of the UK Patent No. GB2249874B, an assembly having two housings is disclosed. One of the housings contains a plurality of solenoids, and the other contains a circuit card. A plurality of elastomeric seating members are mounted within a plurality of bores communicating between the housings, respectively, so as to provide a seat for each wire connected to each solenoid, and provide a seal between the two housings.

Referring to FIG. 5 which illustrates the assembly as disclosed in the British publication of GB2249874B and in which the reference numerals in the parentheses are the same as those used in the British publication, a valve housing for an anti-skid brake controller (ABS) (20) is connected to a housing (24), which is connected to a housing (48). The valve housing (20) is made of ferromagnetic material in order to conduct magnetic flux from an array of solenoids (only one of which is shown in FIG.5). Each solenoid comprises an annular coil (26) which surrounds a dome (30) and which is encased in a metal yoke (28). Extending from the upper part of solenoid coils (26) are two stiff metal wire conductors (34) through bores (32) of the housing (24), respectively, in order to make electronic connection with a flexible circuit card (38). Elastomeric members (40) surround each wire (34) and are disposed in the bores (32). Elastomeric member (40) provides a seating for the coil (26) and permits relative movement of the coil within the housing (24) to a certain extent determined by the flexibility of the elastomeric member.

According to the electromagnetic valve unit disclosed in the British publication, however, since the housing (24) is formed with a plurality of bores (32) into which a plurality of the elastomeric members (40) are inserted, respectively, it is necessary to provide a seal (especially for a water-proof) for each bore, and it is difficult to assemble them. Although it may be possible to connect the elastomeric members (40) together so as to form them in a body, as also disclosed in the British publication, it is still difficult to assemble them.

SUMMARY OF THE INVENTION

Accordingly, it is an object of the present invention to provide an electromagnetic valve unit which is provided with a plurality of electromagnetic valves, a circuit board mounting thereon electronic control elements for controlling the valves, and a member for electrically connecting the circuit board with the valves, which can be easily assembled.

It is another object of the present invention to easily provide an effective seal for the member for electrically connecting the circuit board with the valves.

In accomplishing these and other objects, an electromagnetic valve unit according to the present invention includes a housing for defining therein a first chamber and a second chamber separated by a wall member having at least a communication hole, and includes a plurality of electromagnetic valves each having at least a terminal. At least a part of each electromagnetic valve is mounted in the first chamber. A circuit board for mounting thereon an electronic control element for controlling the electromagnetic valves is mounted in the second chamber. The valve unit further includes a conductive member one end portion of which is connected with each terminal of the electromagnetic valves, and the other end portion of which is connected with the circuit board through the communication hole of the wall member.

It is preferable that each of the electromagnetic valves comprises a valve portion and a solenoid coil portion which is separable from the valve portion and which has the terminal connected with the conductive member.

Preferably, the electromagnetic valve further includes a seal member which is adapted for holding the conductive member in the communication hole of the wall member to provide a seal therebetween.

As for the seal member, a resilient grommet having at least a hole for receiving therein each terminal of the electromagnetic valves may be employed, and fitted into the communication hole of the wall member. Alternatively, a resin member may be filled in the communication hole of the wall member and cured to hold each terminal of the electromagnetic valves.

BRIEF DESCRIPTION OF THE DRAWINGS

The above stated objects and following description will become readily apparent with reference to the accompanying drawings, wherein like reference numerals denote like elements, and in which.

DESCRIPTION OF THE PREFERRED EMBODIMENTS

Figure 1:
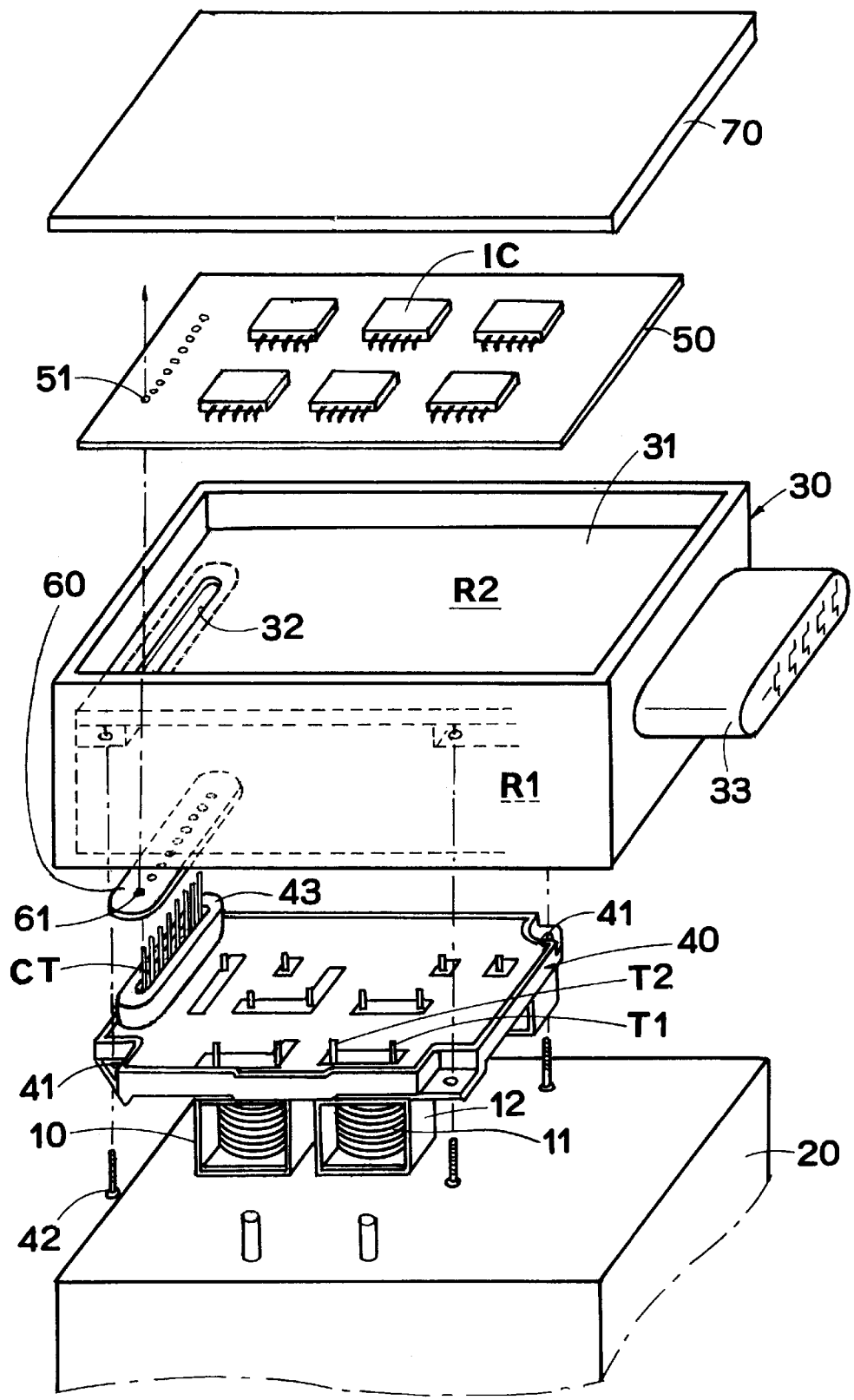
FIG. 1 is a perspective view of an electromagnetic valve unit in its disassembled state according to an embodiment of the present invention.
Figure 2:
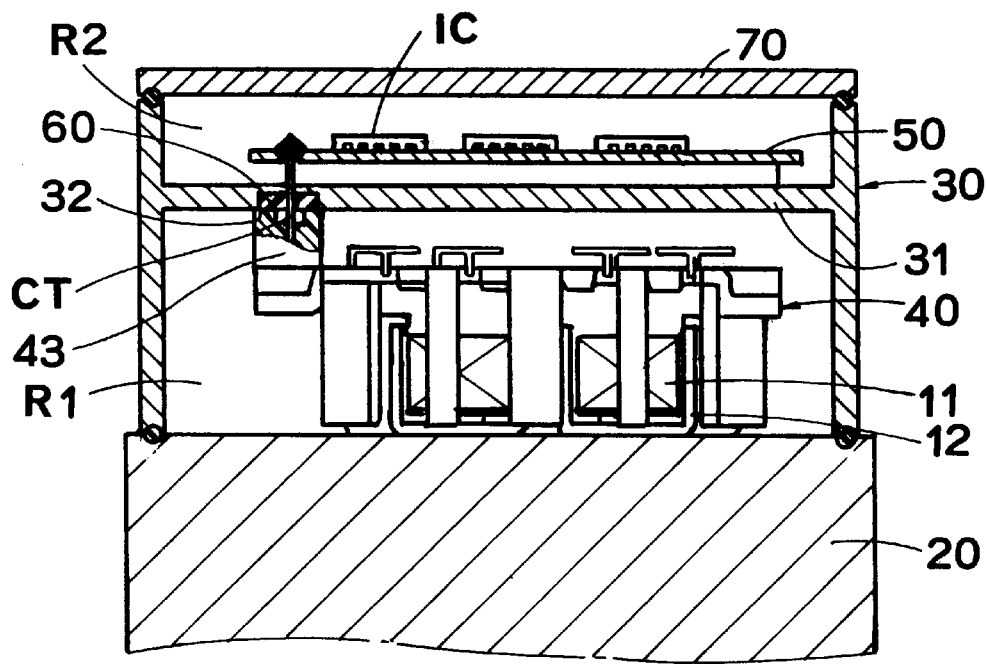
FIG. 2 is a vertical sectional view of an electromagnetic valve unit according to an embodiment of the present invention.

Referring to the drawings, there is shown in FIGS. 1 and 2 an electromagnetic valve unit according to an embodiment of the present invention, which is provided for a hydraulic pressure control apparatus (not shown) for use in an anti-skid control system of an automobile. The electromagnetic valve unit is a box-like device having a valve body 20 which provides therein a hydraulic pressure control circuit and mounts thereon a plurality of electromagnetic valves, e.g., six valves (represented by 10 in FIG. 1), a housing 30 which is secured to the valve body 20, with a packing disposed therebetween, if necessary, and a cover 70 which is secured to the housing 30, with another packing disposed therebetween, if necessary. The cover 70 is made of synthetic resin, for example, and is shaped to match the configuration of the housing 30.

Each electromagnetic valve 10 is a two-position solenoid operated valve, for example, a valve portion (not shown) of which is accommodated in the valve body 20, and a solenoid coil portion of which is supported by an intermediate member 40 as shown in FIG. 1. Each electromagnetic valve 10 is provided with terminals T1, T2 extending upward from it.

The housing 30 is formed with a partition wall 31 which serves as a wall member, so that a first chamber R1 is defined between the partition wall 30 and the valve body 20, and a second chamber R2 is defined between the partition wall 30 and the cover 70. The intermediate member 40 is disposed in the first chamber R1, while an electronic control circuit board 50 is disposed in the second chamber R2. A connector portion 33 is formed outside of the housing 30, and an elongated communication hole 32 which serves as a slot is formed on the partition wall 31. The communication hole 32 is formed to be relatively broad in width at the side facing with the first chamber R1 and relatively narrow at the side facing with the second chamber R2, so that a stepped bore is formed to provide a recess at the side facing with the first chamber R1.

The intermediate member 40 is provided for supporting a coil 11 and a yoke 12 for each electromagnetic valve 10, and includes a bus bar which serves as a conductive member, one end portion of which is provided with a plurality of connecting terminals (represented by CT) assembled at a certain place to extend upward therefrom as shown in FIG. 1, and the other end portion of which is connected to the terminals T1, T2 of each electromagnetic valve 10. The bus bar is made by embedding conductive members in various shapes in an insulating resin member to be formed in a body, for example. The intermediate member 40 is secured to the housing 30 by screwing screws 42 into installation holes (not shown) of the housing 30 through holes 41 of the intermediate member 40. In lieu of the screws 42, however, any other securing members may be employed. As shown in FIGS. 1 and 2, the intermediate member 40 is formed with an extending portion 43 so as to enclose base end portions of the connecting terminals CT.

Figure 3:
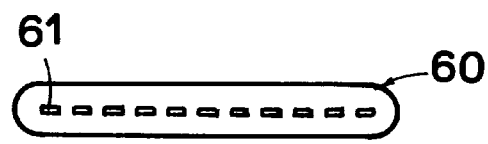
FIG. 3 is a plan view of a grommet for use in an electromagnetic valve unit according to an embodiment of the present invention.

A grommet 60 which is made of insulating resilient material such as rubber and which serves as a seal member, is fitted into the communication hole 32 of the housing 30 at the side thereof to be relatively broad in width and facing with the first chamber R1. As shown in FIG. 3, the grommet 60 has a plurality of communication holes (represented by 61) aligned along its longitudinal axis for receiving therein the connecting terminals CT, respectively. The grommet 60 is fitted into the communication hole 32 at the side thereof relatively broad in width, so that the communication holes 61 are communicated with the second chamber R2 through the communication hole 32 at the side thereof relatively narrow in width. In lieu of the communication hole 32 formed at the side of the communication hole 32 relatively narrow in width, a plurality of holes may be formed so as to match the communication holes 61, respectively.

On the circuit board 50, mounted are a plurality of electronic control elements (represented by IC) for controlling the electromagnetic valves. As shown in FIG. 1, a plurality of communication holes 51 are formed at an end portion of the circuit board 50 so as to be aligned along the longitudinal axis of the communication hole 32 when mounted in the housing 30. Through these communication holes 51, the connecting terminals CT are electrically connected with the electronic control elements IC and the like. The circuit board 50 is also electrically connected with a connector portion 33. However, the circuit board 50 may be provided with connector terminals (not shown), which will be inserted into the connector portion 33 later.

For assembling the above-described components, the grommet 60 is fitted into the communication hole 32 at the side thereof relatively broad in width. Then, each electromagnetic valve 10 is mounted on the intermediate member 40, and its terminals T1, T2 is connected with the bus bar in the intermediate member 40 to form a sub-assembly as shown in FIG. 1. Then, the intermediate member 40 is received in the first chamber R1 and secured to the housing 30 by the screws 42. At this time, the connecting terminals CT are inserted into the second chamber R2 through the communication holes 61 of the grommet 60. When the intermediate member 40 is secured in the first chamber R1, the extending portion 43 formed on the intermediate member 40 is pressed onto the grommet 60, so that the grommet 60 will be held within the communication hole 32.

Then, the circuit board 50 is received in the second chamber R2 of of the housing 30, and secured at a predetermined position. At this time, the connecting terminals CT extend upward through the communication holes 51 as shown in FIG. 1, so as to be electrically connected with the circuit in the circuit board 50, e.g., soldered as shown in FIG. 2. After the circuit board 50 is electrically connected with the connector portion 33 (or, the connector terminals (not shown) of the circuit board 50 are inserted into the connector portion 33), the cover 70 is secured to the housing 30 to close the second chamber R2.

After the components are assembled as described above, the housing 30 is secured to the valve body 20 to close the first chamber R1. Alternatively, it may be so arranged that the intermediate member 40 is secured to the housing 30, then the housing 30 is secured to the valve body 20, thereafter the circuit board 50 is received in the housing 30, and the cover 70 is secured to the housing 30.

As described above, the single grommet 60 is fitted into the single communication hole 32, and the connecting terminals CT which are mounted together on the intermediate member 40 at the predetermined place thereof are inserted into the second chamber R2 through the communication holes 61 of the grommet 60 and the communication holes 51 of the circuit board 50, so that they can be easily assembled. The connecting terminals CT are held by the grommet 60 fluid-tightly, so that a stable water-proof sealing can be ensured between the first and second chambers R1, R2. Especially, when the intermediate member 40 is secured in the first chamber R1, the connecting terminals CT are to be inserted into the second chamber R2 through the communication holes 61, so that wiring or electric connection can be made easily. In addition, the grommet 60 can be held effectively within the communication hole 32 by means of the extending portion 43 formed on the intermediate member 40.

Figure 4:
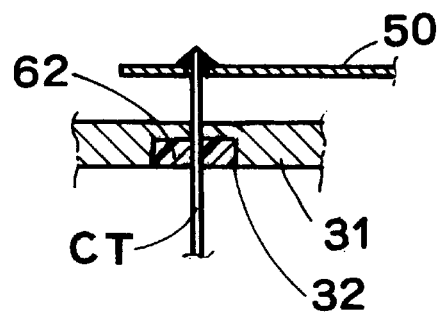
FIG. 4 is a sectional view of another embodiment of a seal member for use in an electromagnetic valve unit according to the present invention.
Figure 5:
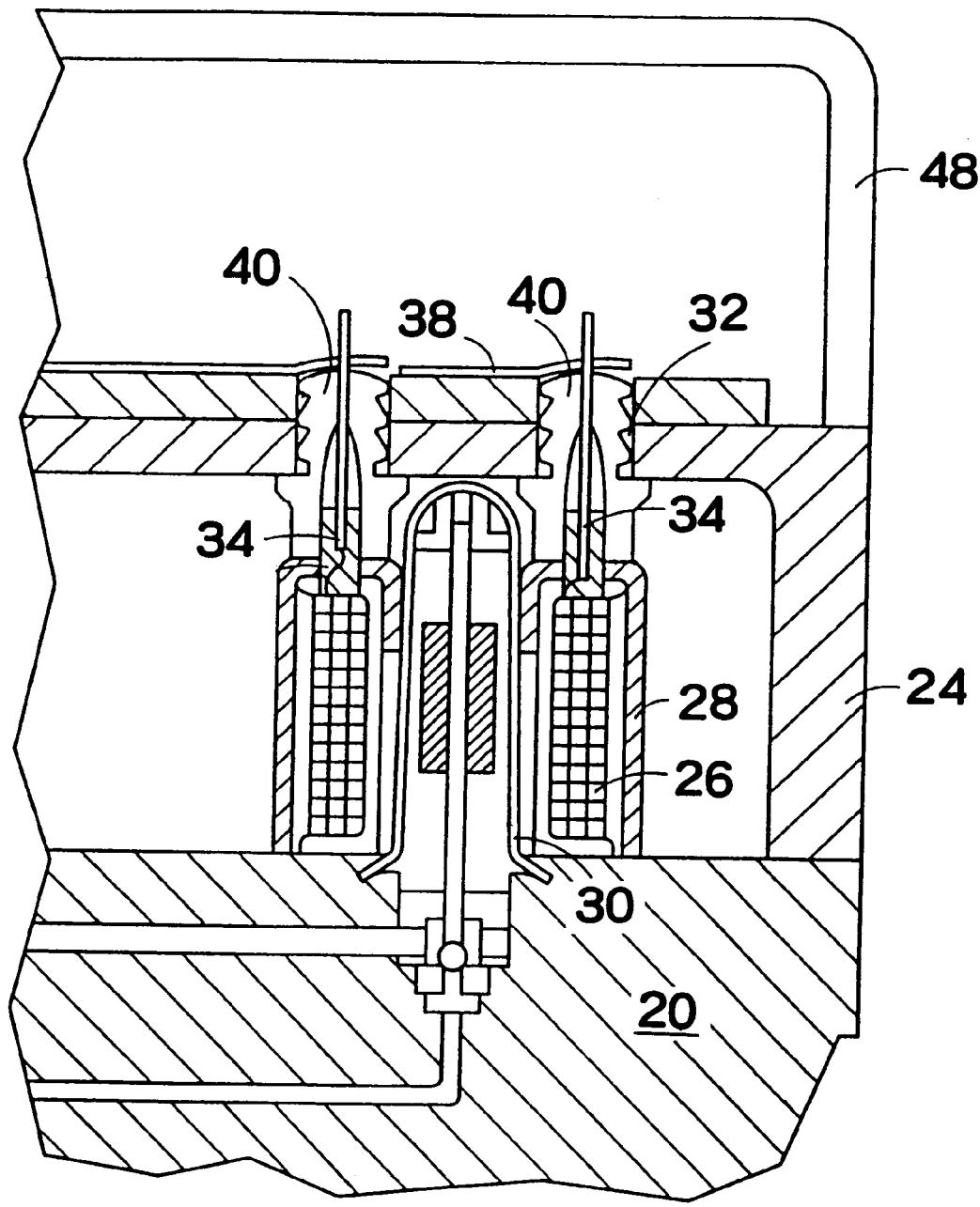
FIG. 5 is a vertical sectional view of a prior valve unit.

FIG. 4 illustrates another embodiment of the seal member disposed in the communication hole 32 of the partition wall 31. According to this embodiment, in lieu of the grommet 60, insulating resin material is filled into the communication hole 32 after the connecting terminals CT are inserted into the second chamber R2 through the communication hole 32, and cured to form a resin member 62 as shown in FIG. 4. Whereby, the connecting terminals CT can be easily inserted into the communication hole 32 without inserting the connecting terminals CT through the communication holes 61 of the grommet 60, so that the intermediate member 40 can be easily mounted in the first chamber R1.

It should be apparent to one skilled in the art that the above-described embodiments are merely illustrative of but a few of the many possible specific embodiments of the present invention. Numerous and various other arrangements can be readily devised by those skilled in the art without departing from the spirit and scope of the invention as defined in the following claims.

What is claimed is:

1. An electromagnetic valve unit comprising:
    a housing for defining therein a first chamber and a second chamber separated by a wall member having at least a communication hole;
    a plurality of electromagnetic valves each having at least a terminal, at least a part of each electromagnetic valve being mounted in said first chamber;
    a circuit board for mounting thereon an electronic control element for controlling said electromagnetic valves, said circuit board being mounted in said second chamber; and
    a conductive member having one end portion connected with each terminal of said electromagnetic valves, and the other end portion connected with said circuit board through said communication hole of said wall member.

2. An electromagnetic valve unit as set forth in claim 1, wherein each of said electromagnetic valves comprises a valve portion and a solenoid coil portion separable therefrom having said terminal connected with said conductive member.

3. An electromagnetic valve unit as set forth in claim 1, further comprising a seal member for holding said conductive member in said communication hole of said wall member to provide a seal therebetween.

4. An electromagnetic valve unit as set forth in claim 3, wherein said seal member is a resilient grommet having at least a hole for receiving a connecting terminal of said conductive member, and covering said communication hole of said wall member.

5. An electromagnetic valve unit as set forth in claim 3, wherein said seal member is a resin member which is filled in each communication hole of said wall member and cured to hold a plurality of connecting terminals of said conductive member.

6. An electromagnetic valve unit as set forth in claim 1, wherein said communication hole of said wall member is a slot formed on said wall member, and wherein said conductive member includes a plurality of connecting terminals which are inserted into said second chamber through said slot to be connected with said circuit board.

7. An electromagnetic valve unit as set forth in claim 6, further comprising a seal member for covering said slot of said wall member and holding said connecting terminals in said slot to provide a seal therebetween.

8. An electromagnetic valve unit as set forth in claim 7, wherein said seal member is a resilient grommet having a plurality of holes formed thereon and aligned along the longitudinal axis of said slot, and wherein said connecting terminals are inserted into said second chamber through said holes of said seal member, respectively.

9. An electromagnetic valve unit as set forth in claim 8, wherein said wall member has a recess opening to said first chamber and formed around said slot, and wherein said grommet is fitted into said recess.

10. An electromagnetic valve unit as set forth in claim 9, further comprising an intermediate member mounted in said first chamber for holding said conductive member with said connecting terminals extending from said intermediate member, and a support member disposed around said connecting terminals between said wall member and said intermediate member for holding said grommet in said recess.

11. An electromagnetic valve unit as set forth in claim 7, wherein said seal member is a resin member which is filled in said slot of said wall member and cured to hold said connecting terminals in said slot.

12. An electromagnetic valve unit as set forth in claim 11, wherein said wall member has a recess opening to said first chamber and formed around said slot, and wherein said resin member is filled in said recess.

13. An electromagnetic valve unit comprising:
    a housing in which is defined a first chamber and a second chamber separated by a wall member having at least a communication hole;
    a plurality of electromagnetic valves each having a pair of terminals, at least a part of each electromagnetic valve being mounted in said first chamber;
    a circuit board for mounting thereon an electronic control element for controlling said electromagnetic valves, said circuit board being mounted in said second chamber; and
    a conductive member having one end portion connected with both end terminals of each electromagnetic valve, and an opposite end portion connected with said circuit board through said communication hole of said wall member.

14. An electromagnetic valve unit as set forth in claim 13, further comprising a seal member for holding said conductive member in said communication hole of said wall member to provide a seal therebetween.

15. An electromagnetic valve unit as set forth in claim 13, wherein said seal member is a resilient grommet having at least a hole for receiving a connecting terminal of said conductive member, and covering said communication hole of said wall member.

16. An electromagnetic valve unit as set forth in claim 13, wherein said communication hole of said wall member is a slot formed on said wall member, and wherein said conductive member includes a plurality of connecting terminals which are inserted into said second chamber through said slot to be connected with said circuit board.

17. An electromagnetic valve unit as set forth in claim 16, further comprising a seal member for covering said slot of said wall member and holding said connecting terminals in said slot to provide a seal therebetween.

18. An electromagnetic valve as set forth in claim 17, wherein said seal member is a resilient grommet having a plurality of holes formed thereon and aligned along the longitudinal axis of said slot, and wherein said connecting terminals are inserted into said second chamber through said holes of said seal member, respectively.

19. An electromagnetic valve unit as set forth in claim 18, wherein said wall member has a recess opening to said first chamber and formed around said slot, and wherein said grommet is fitted into said recess.

\* \* \* \* \*